US008416055B2

(12) United States Patent
Fitzgibbon et al.

(10) Patent No.: US 8,416,055 B2
(45) Date of Patent: Apr. 9, 2013

(54) MOVEABLE BARRIER OPERATOR FEATURE ADJUSTMENT SYSTEM AND METHOD

(75) Inventors: James J. Fitzgibbon, Batavia, IL (US); Edward T. Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 983 days.

(21) Appl. No.: 11/951,451

(22) Filed: Dec. 6, 2007

(65) Prior Publication Data

US 2009/0146777 A1    Jun. 11, 2009

(51) Int. Cl.
*G05B 19/00*    (2006.01)

(52) U.S. Cl.
USPC ........................................................ 340/5.7

(58) Field of Classification Search ................ 340/5.23, 340/5.64, 426.3, 5.71, 825.69; 318/445, 318/466, 282; 341/176; 702/69; 365/200
See application file for complete search history.

(56) References Cited

U.S. PATENT DOCUMENTS

| | | | | |
|---|---|---|---|---|
| 5,864,297 | A * | 1/1999 | Sollestre et al. | 340/5.23 |
| 5,903,226 | A * | 5/1999 | Suman et al. | 340/12.28 |
| 6,133,703 | A * | 10/2000 | Fitzgibbon et al. | 318/445 |
| 6,326,754 | B1 | 12/2001 | Mullet et al. | |
| 7,034,486 | B1 * | 4/2006 | McMahon | 318/466 |
| 7,071,813 | B2 * | 7/2006 | Fitzgibbon | 340/5.71 |
| 7,230,518 | B2 * | 6/2007 | Fitzgibbon | 340/5.64 |
| 2002/0118579 | A1 * | 8/2002 | Lucy et al. | 365/200 |
| 2003/0098778 | A1 | 5/2003 | Taylor et al. | |
| 2004/0222913 | A1 * | 11/2004 | Olmsted et al. | 341/176 |
| 2006/0226961 | A1 * | 10/2006 | Bell et al. | 340/426.3 |
| 2007/0103277 | A1 | 5/2007 | Yuk et al. | |

FOREIGN PATENT DOCUMENTS

EP    1 970 521    9/2008

OTHER PUBLICATIONS

Search Report Under Section 17 Dated Feb. 25, 2009; British Application No. GB0821935.4.
Deposition Upon Oral Examination, vol. I; US District Court—Western District of Washington at Tacoma; Case No. C09-5438 BHS; Jul. 7, 2010.
Motion in Limine—Oral Argument Requested; US District Court—Western District of Washington at Tacoma; Case No. C09-5438 BHS; Oct. 21, 2010.
Defendant's Opposition to Plaintiff's Motion in Limine; US District Court—Western District of Washington at Tacoma; Case No. C09-5438 BHS; Nov. 23, 2010.
Jan. 7, 2011 Opposition to Chamberlain's Motion to Exclude Evidence of Chamberlain's Use of IEI Intellectual Property; US District Court—Western District of Washington at Tacoma; Case No. C09-5438 BHS.
Plaintiff's Supplemental Brief Regarding Chamberlain's Patent Applications; US District Court—Western District of Washington at Tacoma; Case No. C09-5438 BHS; Jul. 7, 2011.

(Continued)

*Primary Examiner* — Albert Wong
*Assistant Examiner* — Kaleria Knox
(74) *Attorney, Agent, or Firm* — Fitch Even Tabin & Flannery LLP

(57) ABSTRACT

At a moveable barrier operator, parameters are adjusted. At a first time, the moveable barrier operator is configured with at least one parameter and adjustment of the at least one parameter is disabled until a predetermined identification signal is received. At a second time, the predetermined identification signal is received and the at least one parameter is responsively adjusted.

25 Claims, 5 Drawing Sheets

OTHER PUBLICATIONS

Transcript of Proceedings Before the Honorable Benjamin H. Settle United States District Judge; US District Court—Western District of Washington at Tacoma; Case No. C09-5438 BHS; Dec. 15, 2010.
Plaintiff's Motion in Limine; US District Court—Western District of Washington at Tacoma; Case No. C09-5438 BHS; Nov. 15, 2010.
Plaintiff's Brief in Opposition to Defendant's Motion in Limine; US District Court—Western District of Washington at Tacoma; Case No. C09-5438 BHS; Nov. 1, 2010.
Declaration in Support of Response to Motion in Limine; US District Court—Western District of Washington at Tacoma; Case No. C09-5438 BHS; Nov. 1, 2010.
Declaration in Support of Motion in Limine; US District Court—Western District of Washington at Tacoma; Case No. C09-5438 BHS; Oct. 21, 2010.

* cited by examiner

MOVEABLE BARRIER OPERATOR FEATURE ADJUSTMENT SYSTEM AND METHOD

FIELD OF THE INVENTION

The field of the invention relates to moveable barrier operators and, more specifically, to the actuation of these systems.

BACKGROUND

Different types of moveable barrier operators have been sold over the years and these barrier operator systems have been used to actuate various types of moveable barriers. For example, garage door operators have been used to move garage doors and gate operators have been used to open and close gates.

Such barrier movement operators may include various mechanisms to open and close the barrier. For instance, a wall control unit may be coupled to the barrier movement operator and send signals to a head unit thereby causing the head unit to open and close the barrier. In addition, operators often include a receiver unit at the head unit to receive wireless transmissions from a hand-held code transmitter or from a keypad transmitter, which may be affixed to the outside of the area closed by the barrier or other structure.

In previous barrier operator systems, a transmitter was often used to actuate a barrier operator and thereby move the barrier. In some previous systems, the actuation of the transmitter also caused a light attached to the barrier operator to be activated. In other previous systems, the transmitter was used to initiate a procedure that set the force and limit settings of the barrier operator. Still other barrier operator systems allowed the transmitter to enable pet opening functions and delay-to-close functions associated with the barrier.

However, not all features of previous barrier operator systems were permitted to be enabled or adjusted by simply having a user actuate a transmitter. For instance, customers were typically required to first pay for the additional features or adjustments they desired and this usually necessitated that a trained installer manually install the features at the barrier operator. In this regard, installers sometimes needed to use special tools or follow complicated procedures in order to install new features or adjust the parameters of the barrier operator.

The requirement that an installer must make the changes or upgrades to the barrier operator resulted in several problems with these previous systems. For instance, a special interface for making these changes was often required to be installed/used at the barrier operator thereby increasing system costs. Because the procedures to make the changes were often complex, installing and/or changing the features frequently proved to be a time-consuming process resulting in delays in making the adjustments. Furthermore, the end user was frequently inconvenienced during the installation process since every time they desired a new feature be enabled or changed, they had to first schedule an appointment with an installer and then wait for the installer to come to the location of the barrier operator to actually perform the upgrade.

SUMMARY

Approaches are provided whereby enabling and changing of features may be accomplished by any user and without the need to perform complicated installation procedures. The approaches described herein are easy to use and allow ordinary persons to easily and quickly update/change features/settings of the barrier operator while still maintaining adequate security levels.

In many of these embodiments, parameters are adjusted at a moveable barrier operator. At a first time, the moveable barrier operator is configured with one or more parameters and adjustment of these parameters is disabled until a predetermined identification signal is received at the moveable barrier operator. At a second time, the predetermined identification signal is received and the one or more parameters are responsively adjusted.

The first time and the second time may be varied and occur at any time. In one example, the first time occurs when the moveable barrier operator is manufactured and the second time occurs sometime after the moveable barrier operator has been installed. Other examples of when the first and second times occur are possible.

The predetermined identification signal may be transmitted according to any number of formats and include various types of information. In one example, the predetermined identification signal includes a predetermined code. For instance, this code may be a rolling code, a fixed code, or some combination of fixed and rolling code. Other examples of formats are possible.

Using the present approaches, various types of parameter adjustments of the moveable barrier operator can be performed. In one example, a feature of the moveable barrier operator is enabled. For example, a work light feature may be enabled. In another example, an already enabled feature or aspect of any feature of the moveable barrier operator is modified. For instance, in one example, the already enabled feature comprises a force limit and this force limit is adjusted up or down. In another example, multiple features, aspects, or characteristics may be adjusted at the same time.

In others of these embodiments, the presence of the transmitter device (that sends the predetermined identification signal) is first learned and the identity of the transmitter device is then verified. Thereafter, the parameter adjustments of the moveable barrier operator may be performed.

The parameters of the moveable barrier operator can be adjusted in a number of different ways. In one example, the parameters may be automatically adjusted according to received instructions in the predetermined identification signal. In another example, the parameters of the moveable barrier operator may be manually adjusted by using at least one actuator at the moveable barrier operator. In some examples, the adjustment of the parameter may be enabled or allowed for only a predetermined time period.

Thus, approaches are provided that allow the features and settings of a moveable barrier operator to be changed and/or altered in a fast, efficient, and cost-effective manner. Using the approaches described herein allows these changes to be made without the necessity of following time-consuming, complicated, and cumbersome procedures while at the same time still maintaining adequate security levels.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DESCRIPTION

Figure 1:
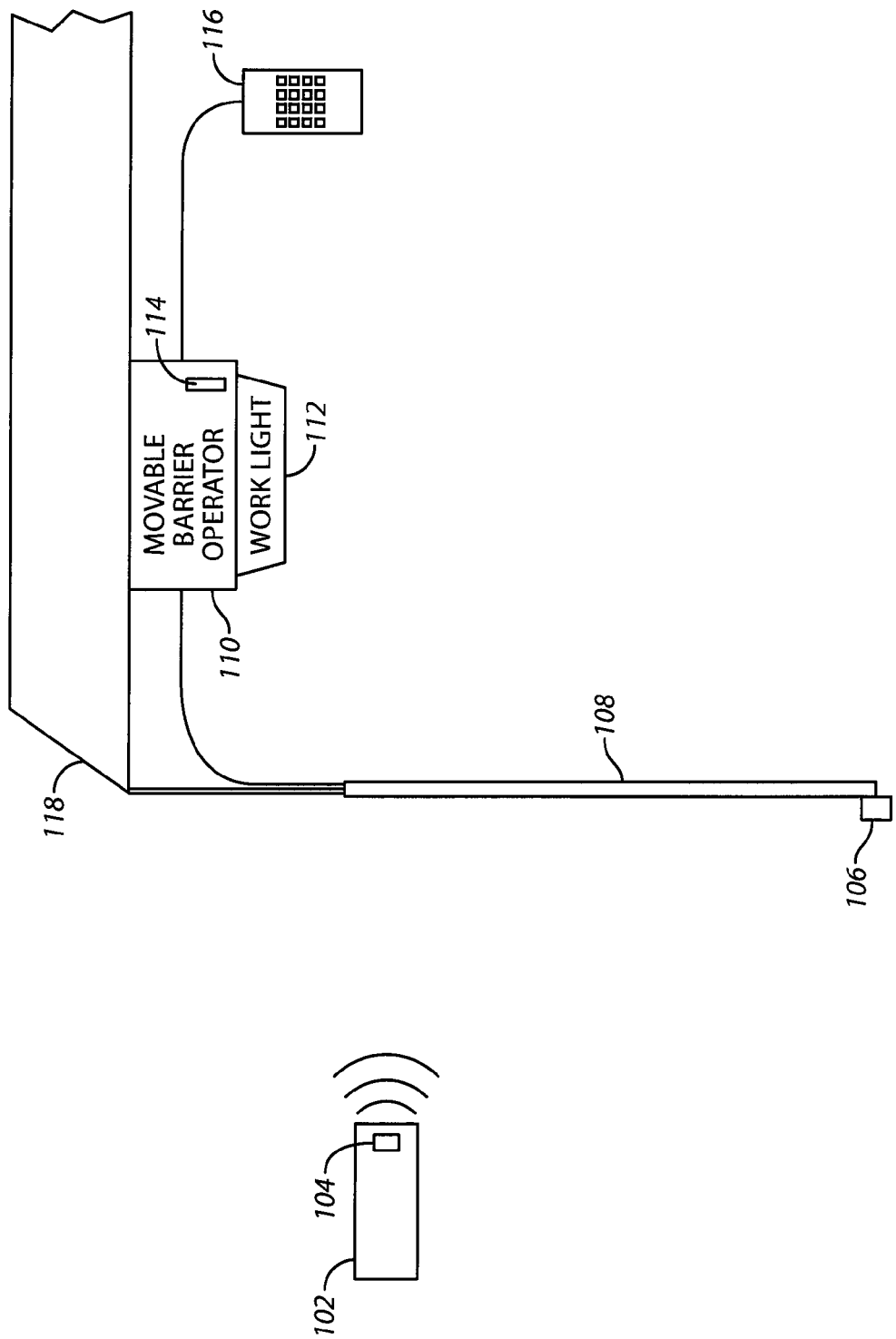
FIG. 1 comprises a block diagram of a moveable barrier system with feature adjustment according to various embodiments the present invention.

Referring now to FIG. 1, a moveable barrier operator system with feature adjustment capabilities is described. A transmitter 102 transmits predetermined identification signals to a moveable barrier operator 110. In this example, the moveable barrier operator 110 is positioned in a garage 118 and moves a barrier 108, which, in this case, is a garage door.

An obstruction detection device 106 detects obstructions that enter or are positioned in the pathway of the barrier 108. In this regard, the obstruction detection device 106 may be a photo beam detector system. Other examples of obstruction detection devices are possible.

A work light 112 and a keypad 116 are coupled to the moveable barrier operator 110. Additionally, switches 114 (or other types of actuators) are disposed on the moveable barrier operator 110 and allow a user or installer to actuate or adjust features associated with the moveable barrier operator 110. In another example, a potentiometer may be used to adjust a force and time delay feature of the moveable barrier operator 110.

The transmitter 102 includes a button 104. The button 104 may be pressed to transmit a predetermined identification signal in order to actuate the moveable barrier operator 110. The predetermined identification signal sent by the transmitter 102 may also include a code or codes. The code or codes may be used to adjust parameters of the moveable barrier operator 110. It will be appreciated that any number of buttons (or other types of actuators such as switches) may be disposed on the transmitter 102.

The moveable barrier operator 110 may be any type of barrier operator. Although shown in FIG. 1 as being a garage door operator, the moveable barrier operator 110 may also be a swinging door operator, a swinging gate operator, or a sliding gate operator. In addition, although the barrier 108 is shown as being a garage door, the barrier 108 may be any type of barrier. For example, the barrier 108 may be a swinging gate, a sliding gate, or shutters. Other examples of barrier operators and barriers are possible.

In one example of the operation of the system of FIG. 1, parameters of the moveable barrier operator 110 are adjusted. At a first time, the moveable barrier operator 110 is configured with one or more parameters and adjustment of these parameters is disabled until a predetermined identification signal is received. The signal may be received from the transmitter 102, the key pad 116, or the switches 114. At a second time, the predetermined identification signal is received and the moveable barrier operator 110 responsively adjusts the one or more parameters.

In one approach, the first time may occur during manufacturing of the moveable barrier operator 110 and the second time may be after the moveable barrier operator 110 has been installed in the garage 118. Other examples of when the first and second times may occur are possible.

The predetermined identification signal received by the moveable barrier operator 110 may be transmitted according to any number of formats and may include various types of information. In one example, the predetermined identification signal includes a predetermined code. The code may include fixed portions and/or rolling portions. Other examples of formats may also be used when transmitting the predetermined identification signal.

Various types of parameter adjustments can be performed at the moveable barrier operator 110. In one example, a feature of the moveable barrier operator 110 is enabled. In another example, an already enabled feature of the moveable barrier operator 110 is modified. In this regard, various examples of parameters may be modified. For instance and to take one example, the already enabled feature comprises a force limit and this force limit may be adjusted. In another example, multiple features, aspects, or characteristics of the moveable barrier operator may be adjusted at the same time.

In another example, the presence of the transmitter 102 that sends the predetermined identification signal is learned and the identity of the transmitter 102 is verified. After the transmitter has been learned by the operator, the features of the moveable barrier operator may be adjusted.

The parameters of the moveable barrier operator 110 can be adjusted in a number of different ways. In one example, the parameters may be automatically adjusted according to received instructions transmitted in the predetermined identification signal received from the transmitter 102. In this example, the instructions can be transmitted a number of times to increase or decrease the parameter. In another example, the parameters may be manually adjusted by using one or more actuators at the moveable barrier operator (e.g., the switches 114). In some examples, the adjustment of the parameters is enabled for only a predetermined time period after the predetermined identification signal is received or verified, and is disabled after the predetermined time period expires. For example, a user or installer may be given 30 minutes to change the parameter once the message is authenticated and after the 30 minute time period expires, the ability to make the changes is disabled. In other examples, the user or installer is allowed to change the parameter once the message is authenticated and after a second message is received.

In another example of the operation of the system of FIG. 1, a human installer uses the transmitter 102 to set a feature of the moveable barrier operator 110. For instance, the installer carries the transmitter 102 and actuates the transmitter 102 when near (i.e., within the reception range of) the moveable barrier operator 110. The actuation of the transmitter 102 causes a predetermined identification signal to be sent to the barrier operator 110. The receipt of this signal automatically enables a particular feature of the moveable barrier operator 110. For instance, a specialized work light feature (e.g., turning on the work light 112 when the barrier 108 is open and when the obstruction detection device 106 detects the presence of an obstruction) is enabled. It will be understood that this is one example of a feature that can be enabled and other examples of features that can be enabled are possible.

In another example of the operation of the system of FIG. 1, the single button 104 may be used to toggle states or modes of operation the moveable barrier operator 110. For example, the single button 104 may be used to toggle between a normal operating mode and a learning mode. Other examples of modes and other sequences of toggling between these modes are possible.

As mentioned above, multiple buttons or other actuators can be used and each button can be used to perform a separate adjustment. For instance, one button can be used to increase a force limit while another button can be used to decrease the force limit. Other functions for the buttons may also be provided.

In still another example of the operation of the system of FIG. 1, the force and limits feature of the moveable barrier operator 110 are adjusted by using the transmitter 102. The force limits feature of the moveable barrier operator 110 records a profile of the force needed to move the barrier 108 between limits of the movement of the barrier 108. Then, a small adjustment amount is added to the force profile to allow or account for operation-to-operation tolerance.

In one example of adjusting the force limits of the barrier operator 110, the transmitter 102 sends a predetermined identification signal to the barrier operator 110. The moveable barrier operator 110 receives and recognizes the predetermined identification signal. The predetermined identification signal may specify the adjustment of the force adder of the force limit feature. In another approach, the receipt of the predetermined identification signal from the transmitter 102 can allow for manual adjustment on the force limits on the moveable barrier operator 110 (e.g., by using the switches 114). In still another approach buttons or other actuators may be pressed after the predetermined identification signal to indicate the magnitude and/or direction of the force limit adjustment. For instance, each push of the button 104 may result in an increase in the force limit by a predetermined amount. In yet another approach, as long as the button 104 is held, the force limit is increased.

Figure 2:
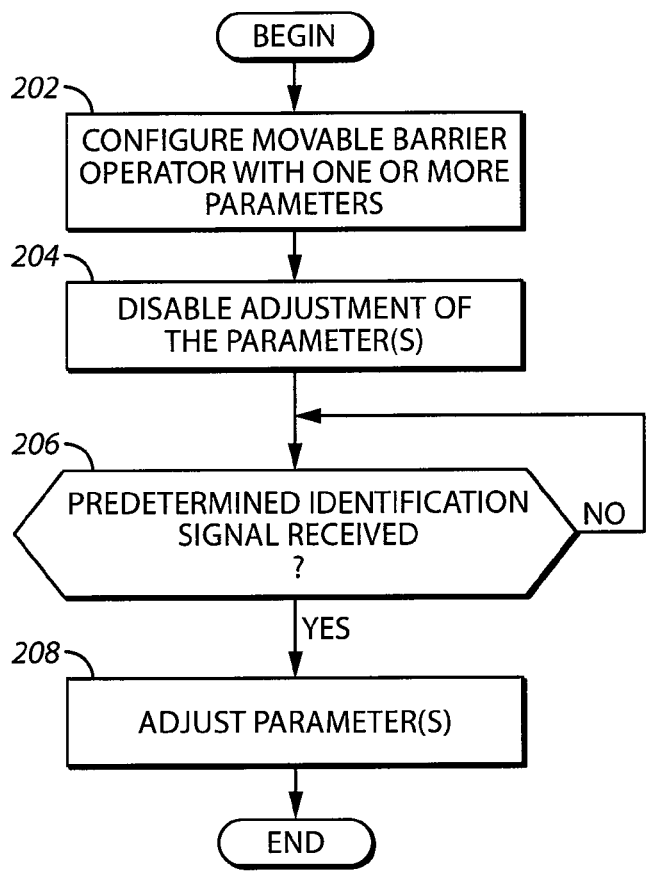
FIG. 2 comprises a flowchart of one approach for feature adjustment in a moveable barrier operator system according to various embodiments of the present invention.

Referring now to FIG. 2, one approach for adjusting features in a moveable barrier operator system is described. At step 202, the moveable barrier operator is configured with one or more parameters. This may occur at the time of manufacturing, in one example. The parameters may relate to features of the moveable barrier operator. At step 204, the adjustment of any parameters is disabled.

At step 206, it is determined if the predetermined identification signal has been received. If the answer is negative, control returns to step 206 to wait and test for the receipt of the predetermined identification signal. If the answer at step 206 is affirmative, then at step 208, the parameters are permitted to be adjusted. In one example, the parameters must be adjusted within a predetermined period of time. In this case, when the predetermined period of time expires, the parameters can no longer be adjusted.

The adjustment of the parameters may take a number of different forms. For example, new features may be activated in the moveable barrier operator. In other examples, characteristics of currently enabled features may be changed or adjusted.

Figure 3:
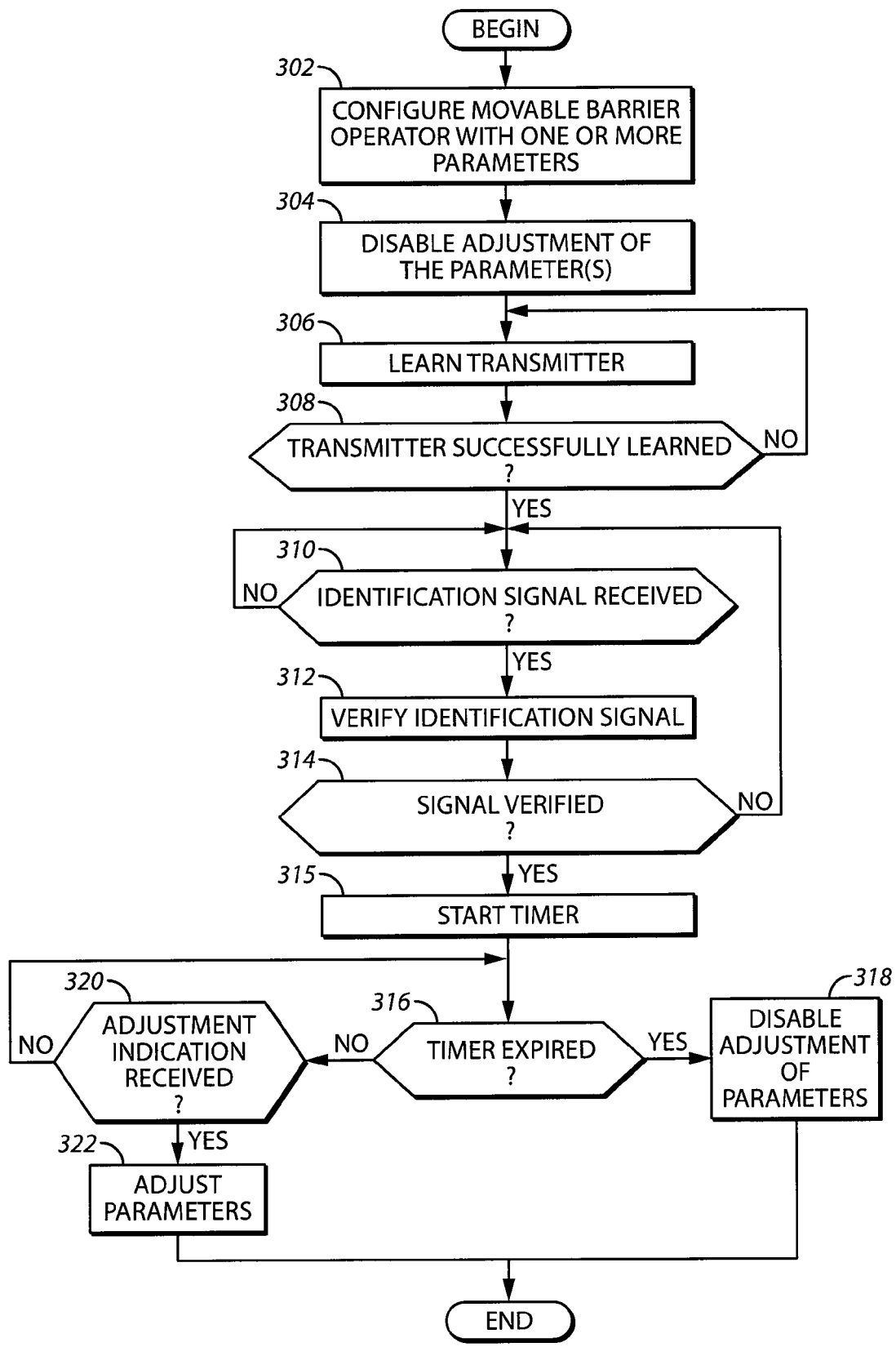
FIG. 3 comprises a flowchart of another approach for feature adjustment in a moveable barrier operator system according to various embodiments of the present invention.

Referring now to FIG. 3, another approach for adjusting features in a moveable barrier operator system is described. At step 302, a moveable barrier operator is configured with one or more parameters. For example, this step may include activating or adding new features to the moveable barrier operator or adjusting currently enabled features. At step 304, the adjustment of parameters (e.g., including the adding of new features or the adjustment of currently enabled features) is disabled. At step 306, the transmitter is learned. For example, the transmitter may send a coded signal and upon receipt and verification of the signal by the moveable barrier operator, the transmitter is learned by the moveable barrier operator.

At step 308, it is determined if the transmitter has been successfully learned. If the answer is negative, then execution continues with step 306 as has been described above. If the answer at step 308 is affirmative, then at step 310 it is determined if a predetermined identification signal has been received. If the answer at step 310 is negative, then execution returns to step 310 where the system again waits for the receipt of a predetermined identification signal. If the answer at step 310 (i.e., a predetermined identification signal has been received), then at step 312, the system attempts to verify that the predetermined identification signal is authentic.

At step 314, it is determined if the predetermined identification signal was successfully verified. If the answer is negative, then control returns to step 310 and execution continues as has been described above. If the answer at step 314 is affirmative, then at step 315 a timer is started and begins to count down.

At step 316, it is determined if the timer has expired. If the answer at step 316 is affirmative, then at step 318 the adjustment of parameters is disabled and execution ends. If the answer at step 316 is negative, then at step 320 it is determined if an adjustment indication has been received. The adjustment indication indicates the nature, type, or other characteristics of the adjustment. For example, if the adjustment is the activation of a new feature, the adjustment indication may be information that enables the activation of the new feature. In another example, if the adjustment is the adjustment of a currently enabled feature, then the adjustment indication may indicate the magnitude and direction of change of the currently enabled feature. Other examples of adjustment indications are possible.

If the answer at step 320 is negative, then execution continues at step 316 as described above. If the answer at step 320 is affirmative, then at step 322 the parameters are adjusted according to the adjustment indicators. Execution then ends.

Figure 4:
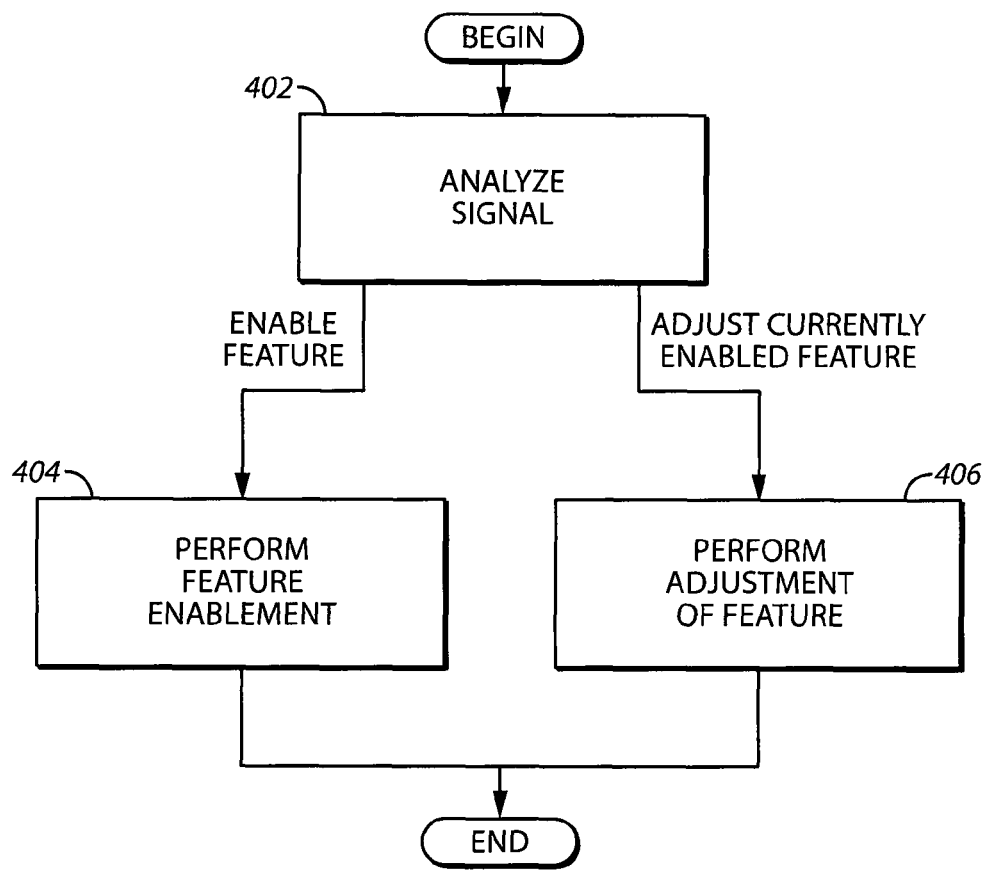
FIG. 4 comprises a flowchart of another approach for feature adjustment in a moveable barrier operator system according to various embodiments of the present invention.

Referring now to FIG. 4, another approach for adjusting features in a moveable barrier operator system is described. At step 402, a signal received by the moveable barrier operator is analyzed. The signal received may be in any format. For example, the signal may include fixed and/or rolling codes. The signal indicates an adjustment to be performed at the moveable barrier operator. In this regard, the signal may indicate that a new feature is to be enabled. The new feature may be preprogrammed to the moveable barrier operator but inactive (i.e., dormant) or the moveable barrier operator may need to receive additional information (e.g., codes) that allow the new feature to be activated or otherwise installed.

If the system determines that a new feature is to be activated, then control continues at step 404. The feature may be already programmed at the moveable barrier operator and the feature may then be enabled. Alternatively, the moveable barrier operator may require additional programming information to enable the feature. With the execution of step 404, the feature is enabled.

If the system determines that a currently enabled feature is to be adjusted then control continues at step 406. In this case, the signal may include the parameter to be adjusted, the direction of adjustment (i.e., up or down), and the magnitude of the adjustment. With the execution of step 406, one or more characteristics of the feature are adjusted.

Figure 5:
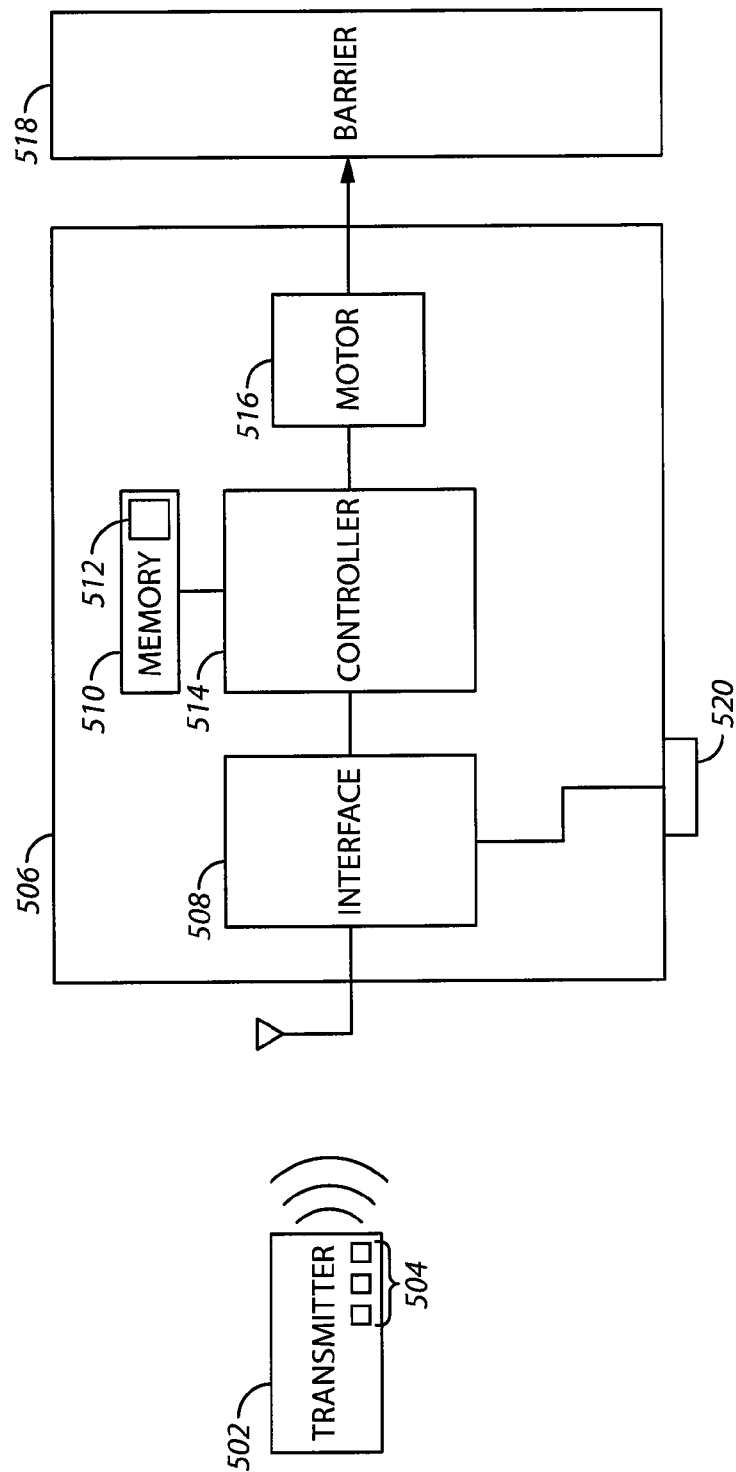
FIG. 5 comprises a block diagram of a moveable barrier operator with feature adjustment capabilities according to various embodiments of the present invention.

Referring now to FIG. 5, a moveable barrier operator 506 that has feature adjustment capabilities is described. The moveable barrier operator 506 includes an interface 508, a controller 514, a memory 510 (including one or more adjustable parameters 512), and a motor 516. The motor 516 moves a barrier 518. A transmitter 502 (including actuators 504) transmits signals to the moveable barrier operator 506.

The moveable barrier operator 506 may be any type of barrier operator. For example, the moveable barrier operator 506 may be a garage door operator, swinging door operator, swinging gate operator, or a sliding gate operator. In addition, the barrier 518 may be any type of barrier such as a garage door, swinging gate, sliding gate, or shutters. Other examples of barrier operators and barriers are possible.

The motor 516 is configured and arranged to move the barrier 518 at the direction of the controller 514. The interface 508 is configured and arranged to receive a predetermined identification signal from the transmitter 502. The parameters 512 are configured at a first time, for example, at the time of manufacturing of the barrier operator 506. The controller 514 is configured and arranged to disable adjustment of the parameters 512 until the predetermined identification signal is received from the transmitter 502 at the interface 508 at a second time. In this example, the second time is later than the first time.

The one or more parameters 512 may be associated with enabling a feature of the moveable barrier operator or may be associated with modifying an already enabled characteristic or feature of the moveable barrier operator. In one example, the already enabled feature or characteristic comprises a force limit feature of the moveable barrier operator and the force limit characteristics of this feature may be increased or decreased.

The controller 514 may be further configured and arranged to learn a presence of a secure transmitter device 502 by receiving the predetermined identification signal. The controller 514 may then responsively verify an identity of the secure transmitter device. Once learned, adjustments to the features of the moveable barrier operator may be permitted as described herein.

In other approaches, the controller 514 is configured and arranged to automatically adjust the one or more parameters 512 based upon instructions received at the interface 508. In still other examples, an adjustment member 520 is coupled to the interface 508. The adjustment member 520 is configured and arranged to provide for manual adjustment of the one or more parameters 512. In one example, the controller 514 is programmed to allow adjustment of the parameters for only a predetermined time period.

Thus, approaches are provided that allow the features and settings of a moveable barrier operator to be changed and/or altered in a fast and cost-effective manner. Using the approaches described herein, these changes to be made with the necessity of following complicated and cumbersome procedures and still be accomplished in a secure manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for parameter adjustment of a movable barrier operator with a transmitter comprising:
at a first time, configuring the movable barrier operator with at least one parameter to be adjusted in response to receiving at the movable barrier operator a wireless identification signal comprising an instruction code from the transmitter and disabling adjustment of the at least one parameter until an identification signal is received from the transmitter; and
at a second time, receiving the wireless identification signal at the movable barrier operator, the wireless identification signal being representative of the transmitter and a selected parameter that is identified and selected at the transmitter, the wireless identification signal responsively automatically effecting adjustment of the selected parameter in response to receiving the wireless identification signal from the transmitter.

2. The method of claim 1 wherein the first time occurs during manufacturing of the movable barrier operator.

3. The method of claim 1 wherein the instruction code effects adjustment of the selected parameter.

4. The method of claim 1 wherein responsively adjusting the at least one parameter comprises enabling a feature of the movable barrier operator.

5. The method of claim 1 wherein responsively adjusting the at least one parameter comprises modifying an already enabled feature of the movable barrier operator.

6. The method of claim 5 wherein the already enabled feature comprises a force limit.

7. The method of claim 1 further comprising learning a presence of a secure transmitter device that sends the identification signal and verifying an identity of the secure transmitter device.

8. The method of claim 1 further comprising allowing adjustment of the at least one parameter for only a time period.

9. A movable barrier operator comprising:
a motor configured and arranged to move a barrier;
a memory configured with at least one parameter that has been disabled from adjustment at a first time until an identification signal has been received by the movable barrier operator, the at least one parameter selected from the group consisting of at least one adjustment parameter and at least one new function parameter that provides the movable barrier operator with a new function that does not operate at the first time;
an interface configured and arranged to receive the identification signal comprising at least one instruction; and
a controller coupled to the motor and the interface, the controller being configured and arranged to:
responsively adjust the adjustment parameter when the identification signal is selected at a transmitter and wirelessly received from the transmitter at the interface at a second time which second time is later than the first time or
responsively add the new feature to allow it to be part of operation of the movable barrier operator when the identification signal selected at the transmitter and is received at the interface at the second time, which second time is later than the first time.

10. The movable barrier operator of claim 9 wherein the first time occurs during manufacturing of the movable barrier operator.

11. The movable barrier operator of claim 9 wherein the identification signal includes code that effects the instruction.

12. The movable barrier operator of claim 9 wherein the at responsive adjustment of the adjustment parameter is associated with modifying an already enabled feature of the movable barrier operator.

13. The movable barrier operator of claim 12 wherein the already enabled feature comprises a force limit.

14. The movable barrier operator of claim 9 wherein the controller is further configured and arranged to learn a presence of a secure transmitter device sending the identification signal and to responsively verify an identity of the secure transmitter device.

15. The movable barrier operator of claim 9 wherein the controller is configured and arranged to allow adjustment of the at least one parameter for only a time period.

16. A method comprising:
at a movable barrier operator:
configuring the movable barrier operator at a first time with respect to at least one parameter, the at least one parameter not adjustable until the movable barrier operator receives a wireless identification signal from a transmitter at a second time after the first time, the wireless identification signal including an indication that the at least one parameter was selected at the transmitter for adjustment;
subsequently receiving the wireless identification signal from the transmitter at the second time;
automatically enabling manual adjustment of the at least one parameter in response to receiving the wireless identification signal from the transmitter responsively.

17. The method of claim 16 further comprising allowing manual adjustment of the at least one parameter for only a limited time period.

18. The method of claim 16 wherein the at least one parameter comprises at least one of a work light feature or a force limit parameter.

19. The method of claim 16 wherein the at least one parameter is associated with at least one of enabling a feature of the movable barrier operator or modifying an already enabled feature of the movable barrier operator.

20. A method for parameter adjustment of a movable barrier operator with a transmitter, the method comprising:
at a first time, configuring the movable barrier operator with parameters comprising at least one new parameter configured to effect enabling a new feature at a later second time and at least one adjustment parameter configured to be adjusted at a later second time,
in response to the configuration, disabling the adjustment parameter and at least one new parameter until a selected wireless identification signal is selected at the transmitter and is received and identified at the movable barrier operator at a second time; and
at the second time, receiving the selected wireless identification signal at the movable barrier operator, the selected wireless identification signal being representative of the transmitter and a selected parameter representative of one or more of the at least one new parameter or the at least one adjustment parameter that is selected at the transmitter and identified at the movable barrier operator, the selected wireless identification signal responsively automatically effecting adjustment of the one or more of the at least one adjustable parameter or effecting addition of the new feature in response to receiving the selected wireless identification signal from the transmitter.

21. The method of claim 20 wherein the first time occurs during manufacturing of the movable barrier operator.

22. The method of claim 20 wherein the identification signal includes a code that effects an instruction.

23. The method of claim 20 wherein responsively adjusting the at least one parameter comprises enabling a feature of the movable barrier operator.

24. The method of claim 20 wherein responsively adjusting the at least one parameter comprises modifying an already enabled feature of the movable barrier operator.

25. The method of claim 24 wherein the already enabled feature comprises a force limit.

* * * * *

UNITED STATES PATENT AND TRADEMARK OFFICE
CERTIFICATE OF CORRECTION

PATENT NO. : 8,416,055 B2
APPLICATION NO. : 11/951451
DATED : April 9, 2013
INVENTOR(S) : Fitzgibbon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

In the Claims:

Claim 12, Column 8, Line 64; delete "the at" and insert -- the --.

Signed and Sealed this
Twenty-third Day of September, 2014

Michelle K. Lee
*Deputy Director of the United States Patent and Trademark Office*